US007298951B2

(12) United States Patent
Smrha et al.

(10) Patent No.: US 7,298,951 B2
(45) Date of Patent: Nov. 20, 2007

(54) CABLE MANAGEMENT DEVICE AND METHOD

(75) Inventors: Mark Smrha, Burnsville, MN (US); Chad Sjodin, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/356,319

(22) Filed: Feb. 16, 2006

(65) Prior Publication Data

US 2007/0189693 A1    Aug. 16, 2007

(51) Int. Cl.
G02B 6/00    (2006.01)
(52) U.S. Cl. .................................... 385/135
(58) Field of Classification Search ......... 385/134–137
See application file for complete search history.

(56) References Cited

U.S. PATENT DOCUMENTS

| | | | |
|---|---|---|---|
| 693,127 A | 2/1902 | Gardner et al. |
| 1,751,463 A | 3/1930 | Backus et al. |
| 2,913,210 A | 11/1959 | Tichnor |
| 3,159,368 A | 12/1964 | Ahlbin et al. |
| 3,204,776 A | 9/1965 | Brown et al. |
| 3,315,816 A | 4/1967 | Mallory |
| 3,388,806 A | 6/1968 | Cunningham, Jr. et al. |
| 3,420,482 A | 1/1969 | Taylor |
| 3,512,653 A | 5/1970 | Erismann |
| 3,516,552 A | 6/1970 | Salava |
| 3,986,318 A | 10/1976 | McConnell |
| 4,405,108 A | 9/1983 | Muirhead |
| 4,527,760 A | 7/1985 | Salacuse |
| 4,619,428 A | 10/1986 | Bailey |
| 4,681,233 A | 7/1987 | Roth |
| 5,143,331 A | 9/1992 | Robert |
| 5,163,567 A | 11/1992 | Betts, Sr. |
| 5,379,976 A | 1/1995 | DeGirolamo |
| 5,420,762 A | 5/1995 | Lewis |
| 5,588,631 A | 12/1996 | Yee |
| 5,640,482 A | 6/1997 | Barry et al. |
| 5,653,349 A | 8/1997 | Dana et al. |

(Continued)

FOREIGN PATENT DOCUMENTS

EP    1 160 605 A2    5/2001

(Continued)

OTHER PUBLICATIONS

Exhibit A: "Next Generation Frame (NGF) Product Family Ordering Guide," *ADC Telecommunications, Inc.*, 2 pages (Oct. 1998).

(Continued)

*Primary Examiner*—Brian Healy
*Assistant Examiner*—Charlie Peng
(74) *Attorney, Agent, or Firm*—Merchant & Gould P.C.

(57) ABSTRACT

A cable management device, and associated assembly including a panel. The device including a segmented cable-managing arrangement having a plurality of radius limiting surfaces vertically and forwardly offset from one another. The device provides a number of incremental slack cable storage lengths that accommodates storage of slack cable without the occasion of loose slack. The assembly can include a single device used in combination with one or more other cable management devices, or nested devices to add to the versatility in accommodating various slack cable lengths.

34 Claims, 8 Drawing Sheets

U.S. PATENT DOCUMENTS

| | | |
|---|---|---|
| 5,738,020 A | 4/1998 | Correia |
| 5,758,002 A | 5/1998 | Walters |
| 5,778,130 A | 7/1998 | Walters et al. |
| 5,785,190 A | 7/1998 | Otema |
| 5,791,502 A | 8/1998 | Bietz et al. |
| 6,129,316 A | 10/2000 | Bauer |
| 6,189,847 B1 | 2/2001 | Hart |
| 6,193,198 B1 | 2/2001 | Baur et al. |
| 6,278,830 B1 * | 8/2001 | Levesque et al. ........... 385/136 |
| 6,307,999 B1 * | 10/2001 | Daoud ....................... 385/135 |
| 6,352,164 B1 | 3/2002 | Hyatte et al. |
| 6,363,198 B1 | 3/2002 | Braga et al. |
| 6,398,149 B1 | 6/2002 | Hines et al. |
| 6,405,984 B1 | 6/2002 | Simons et al. |
| 6,443,320 B1 | 9/2002 | Herzog et al. |
| 6,581,788 B1 | 6/2003 | Winig et al. |
| 6,595,379 B1 | 7/2003 | Powell |
| 2004/0094491 A1 | 5/2004 | Smith et al. |
| 2006/0228087 A1 | 10/2006 | Bayazit et al. |

FOREIGN PATENT DOCUMENTS

| | | |
|---|---|---|
| FR | 2 701 345 A1 | 8/1994 |
| WO | WO 01/01534 A1 | 1/2001 |
| WO | WO 02/052866 A2 | 7/2002 |

OTHER PUBLICATIONS

Exhibit B: "Fiber Panel Products, Second Edition," *ADC Telecommunications, Inc.*, 3 pages (Jul. 1996).

Exhibit C: "Fiber Cable Management Products, Third Edition," *ADC Telecommunications, Inc.*, 8 pages (Jun. 1998).

Exhibit D: "Value-Added Module System," *ADC Telecommunications, Inc.*, 2 pages (Jun. 1998).

\* cited by examiner

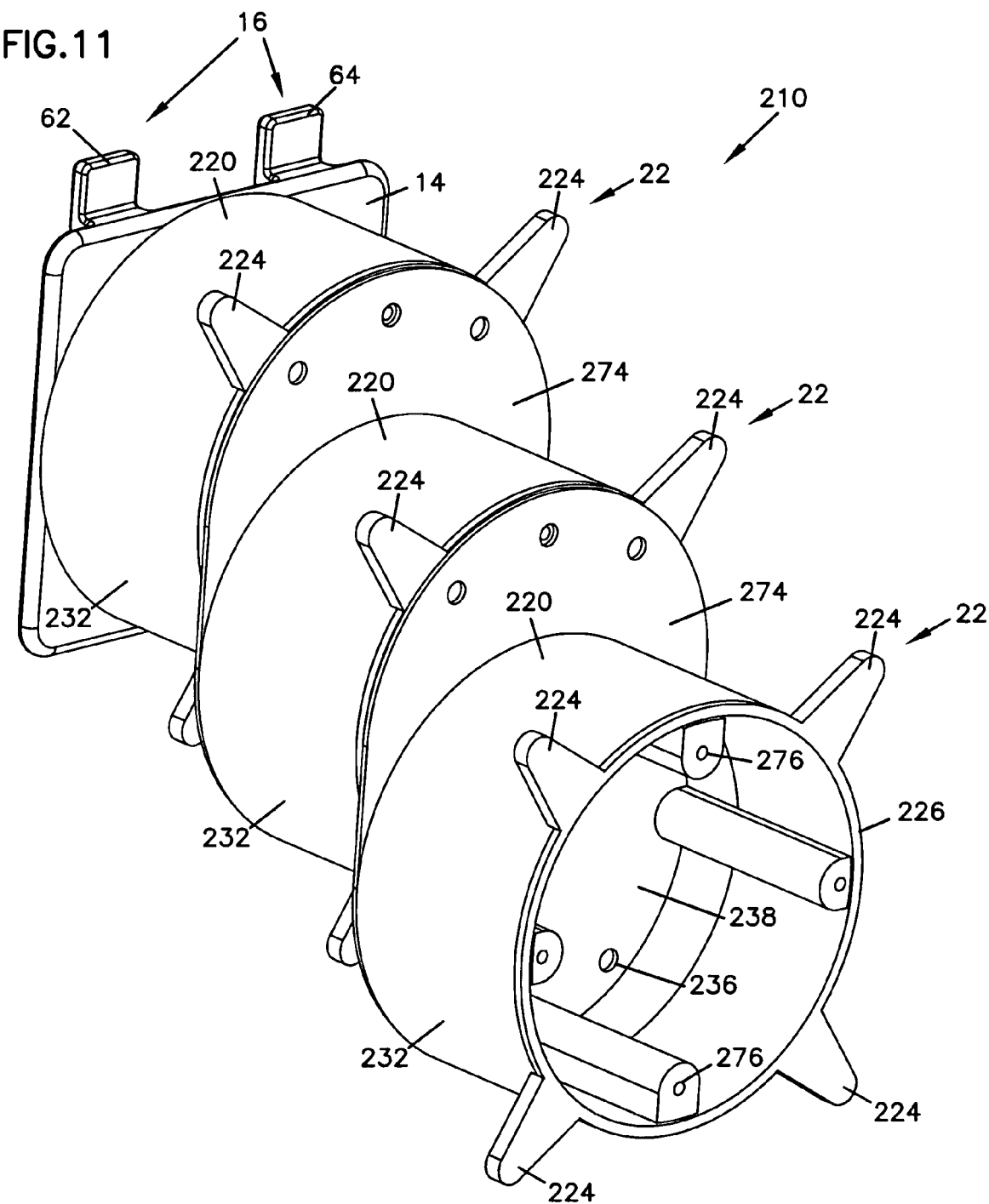

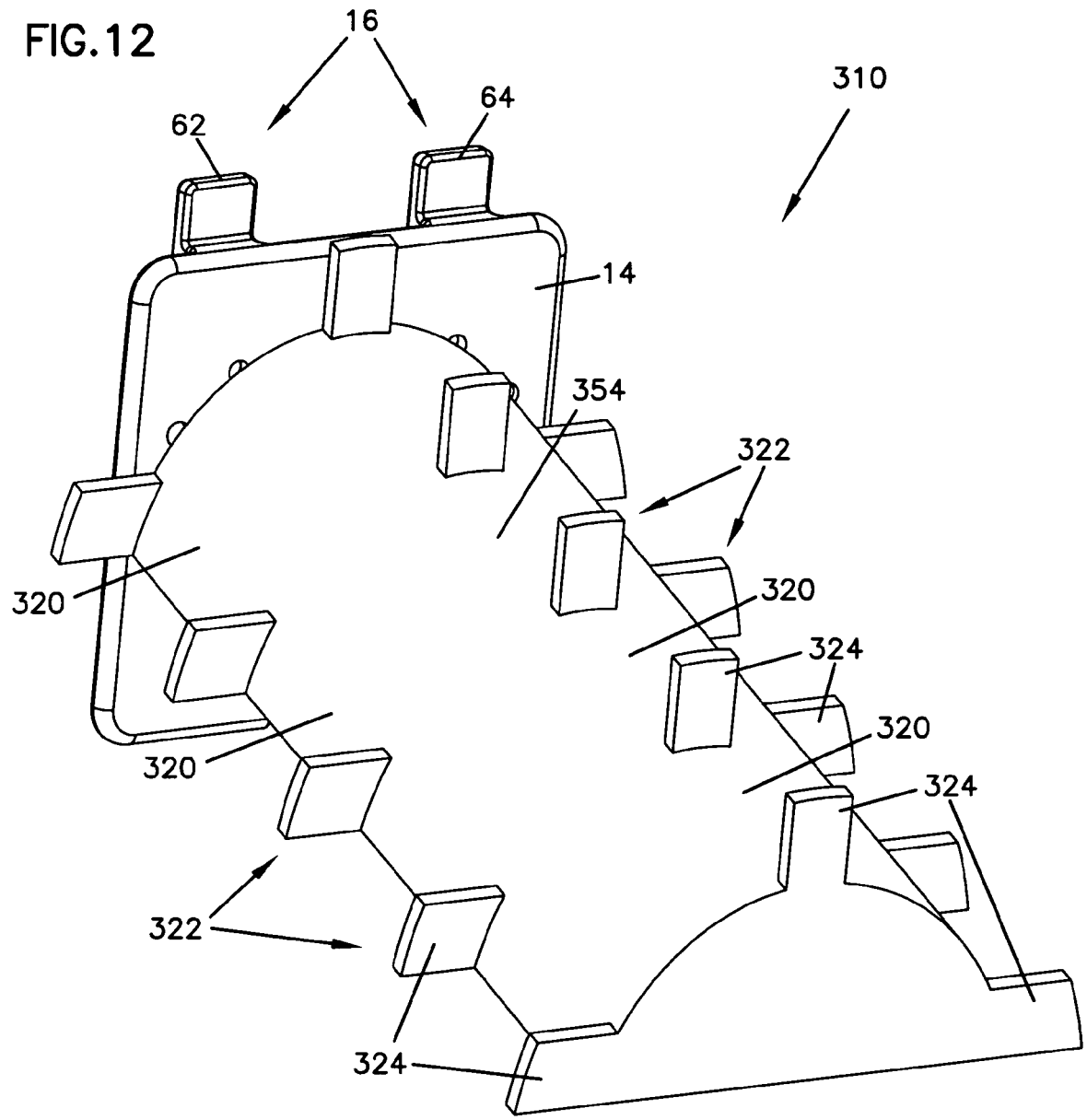

CABLE MANAGEMENT DEVICE AND METHOD

TECHNICAL FIELD

The present invention relates generally to devices and methods for enhancing cable management of telecommunications systems. More particularly, the present invention relates to a cable management device that mounts to a panel for managing slack cable of telecommunications systems.

BACKGROUND

Telecommunications systems utilize cables, such as fiber optic cables or copper twisted pair cables, to interconnect pieces of telecommunications equipment or components. The systems commonly include telecommunication racks that hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves efficiently routing cables to minimize the occupied space, and routing cables in an orderly manner so as to reduce the likelihood of cable tangling. Ease of cable organization is also a factor related to effective cable management.

Cable management is important in preventing damage to the cables. Unnecessary or excessive bending of fiber optic cables, for example, is undesirable. Bending of fibers can cause attenuation and loss of signal strength. As the fiber bends, the fiber can also break, resulting in complete loss of signal transmission through the fiber.

In general, conventional arrangements for managing cable can be improved.

SUMMARY

The present disclosure relates to a fiber optic cable management device having a segmented cable-managing arrangement. The segmented cable-managing arrangement includes a plurality of radius limiting surfaces. The device further includes a back plate having securing structure for securing the device to a telecommunications panel. One or more of the fiber optic cable management devices can be used in an assembly to provide an arrangement that defines multiple, incremental storage lengths for storing the center slack portions of fiber optic cables.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

BRIEF DESCRIPTION OF THE DRAWINGS

FIG. 11 is a perspective view of yet another embodiment of a cable management device shown mounted to the panel of the cable management assembly of FIG. 1; and FIG. 12 is a perspective view of still another embodiment of a cable management device shown mounted to the panel of the cable management assembly of FIG. 1.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
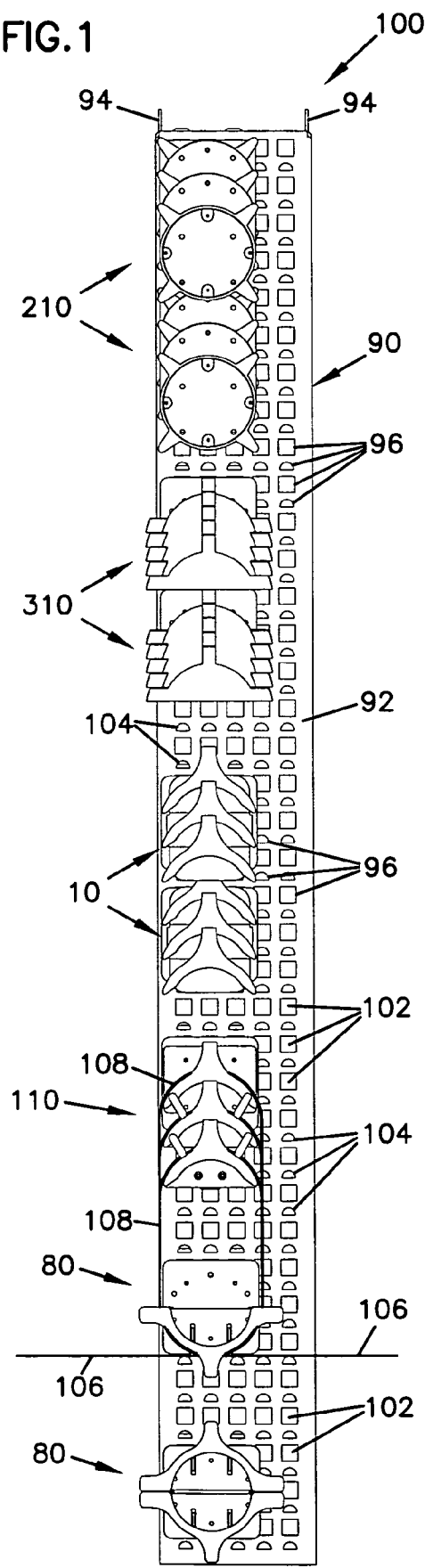
FIG. 1 is a front elevation view of a cable management assembly, including a panel, and illustrating various embodiments of cable management devices that can be used in accordance with the principles disclosed.

Referring to FIG. 1, a telecommunications assembly 100 for managing slack fiber optic cable is illustrated. The telecommunications assembly 100 can be used in telecommunications systems that interconnect various telecommunication components. One such system is described in U.S. patent application Ser. No. 10/295,169, which application is incorporated herein by reference. The telecommunications assembly 100 is typically mounted between adjacent first and second telecommunication racks (not shown). In alternative embodiments, the cable management assembly 100 can be configured for use with other telecommunication structures, such as a cabinet, for example.

Figure 2:
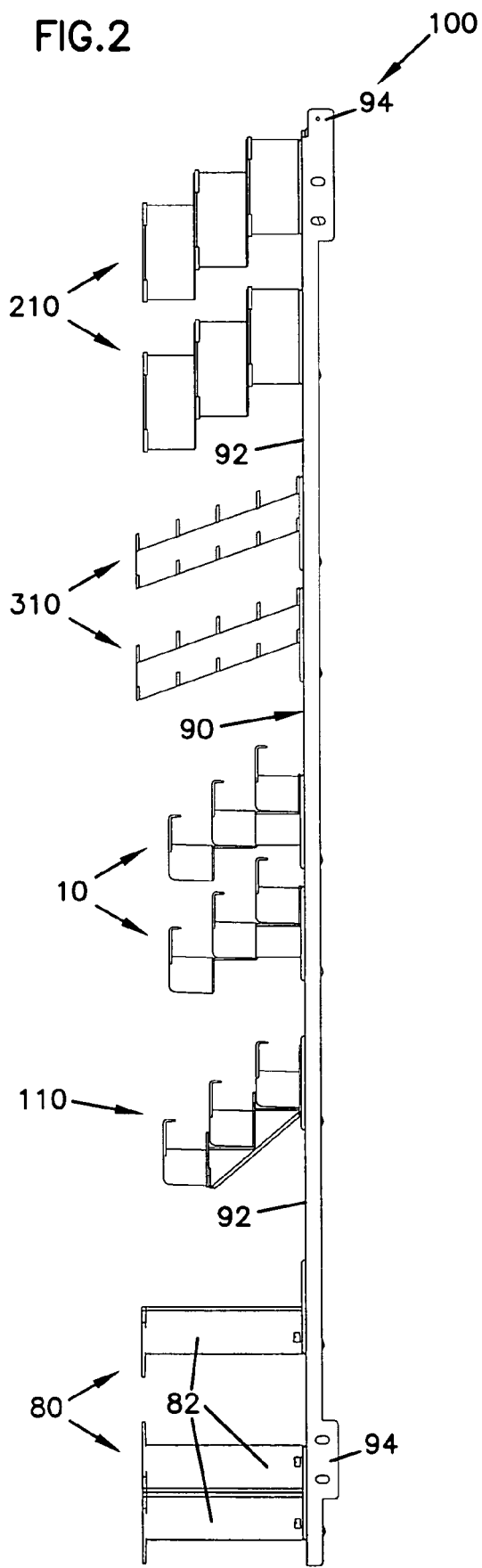
FIG. 2 is a side elevation view of the cable management assembly of FIG. 1.

The cable management assembly 100 includes a cable management panel 90. The cable management panel 90 can also be referred to as a back plane or riser. The panel 90 includes an interface portion 92 and first and second mounting structures 94 configured to mount or attach the cable management assembly 100 to adjacent telecommunication racks. In one embodiment, as shown in FIG. 2, the first and second mounting structures 94 include flanges that extend rearward from the interface portion 92 of the panel 90. Fasteners, such as rivets or screws, can be used to mount the panel 90 to the adjacent telecommunication racks.

The interface portion 92 of the panel 90 defines a plurality of mounting locations, more specifically, a plurality of discrete openings 96. In the illustrate cable management assembly 100, the plurality of discrete openings 96 includes a first type of shaped apertures, i.e., attaching apertures 102, and a second type of shaped apertures, i.e., locating apertures 104. Further details of an example panel that can be used in accordance with the principles disclosed is described in U.S. patent application Ser. No. 11/101,143, the disclosure of which is herein incorporated by reference.

Fiber optic cable management devices (e.g. 10, 110, 210, 310) detachably secure to the panel 90 at the discrete openings 96. In the illustrated assembly of FIGS. 1 and 2, four different embodiments of fiber optic cable management devices 10, 110, 210, 310 are shown mounted to the panel 90 for demonstration purposes. In use, the cable management assembly 100 need only include one of the disclosed embodiments, although more than one embodiment may also be used.

The discrete openings 96 of the panel 90 and the cable management devices are configured so that a technician can organize and arrange fiber optic cables at selected horizontal and vertical mounting locations along the panel 90. What is meant by "selected" is that the technician can choose a mounting location from the plurality of mounting locations, the devices being adapted to mount at all of the mounting locations.

The cable management devices (e.g. 10, 110, 210, 310) and the panel 90 of the present cable management assembly 100 are configured to permit a technician to position any of the different cable management devices at any location on the panel 90 of the cable management assembly 100. The cable management assembly 100 thereby permits a technician to configure the system to a particular need, reducing costs associated with fixed or custom-made cable management systems.

Figure 3:
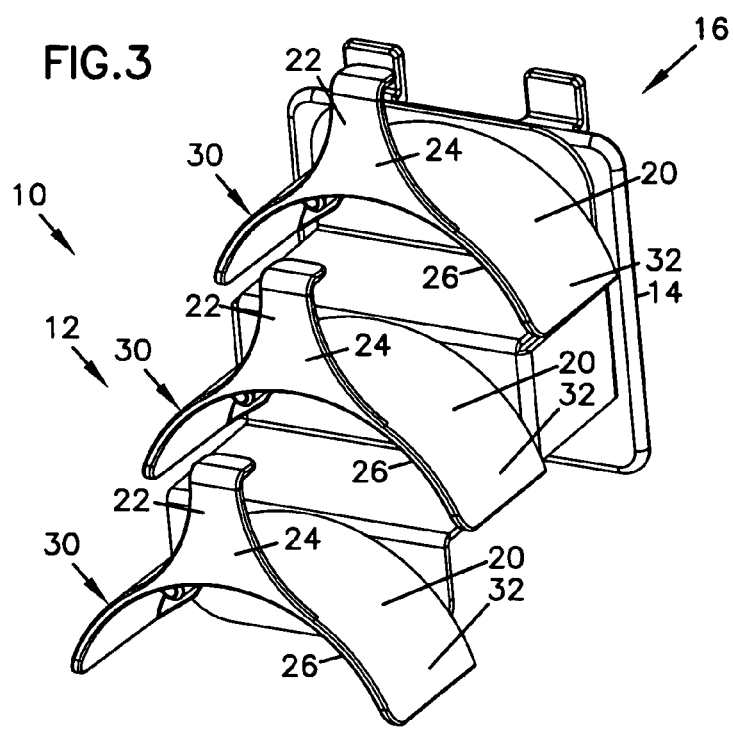
FIG. 3 is a perspective view of one embodiment of a cable management device shown mounted to the panel of the cable management assembly of FIG. 1.

Referring now to FIG. 3, one embodiment of a cable management device 10 having features in accordance with the principles of the present disclosure is illustrated. The illustrated cable management device 10 includes a segmented cable-managing arrangement 12. The segmented cable-managing arrangement 12 is interconnected to a back plate 14 having securing structure 16 that detachably secures the device 10 to the panel 90.

The segmented cable-managing arrangement 12 includes a plurality of radius limiting surfaces 20. The radius limiting surfaces 20 are provided in a descending segmented manner. That is, the radius limiting surfaces 20 define radius limiting segments of the cable-managing arrangement 12 that are vertically offset from one another. More preferably, the segments or radius limiting surfaces 20 are vertically and forwardly offset from one another in a descending relationship. As shown in FIG. 3, the plurality of radius limiting surfaces 20 includes three descending radius limiting segments or surfaces. The lowermost surface is the forward most surface of the three radius limiting surfaces. The feature of providing the radius limiting surfaces 20 in the segmented manner is discussed in greater detailed hereinafter.

In the illustrated embodiment of FIG. 3, the descending segmented cable-managing arrangement 12 is a stepped cable-managing arrangement. What is meant by "stepped" is that the radius limiting surfaces 20 of the stepped arrangement 12 are vertically and forwardly offset from one another in a stepped or rise/run type arrangement.

Still referring to FIG. 3, the radius limiting surfaces 20 are constructed to prevent bending of a fiber optic cable beyond a minimum bend radius. In one embodiment, the minimum bend radius is about 1.50 inches. The segmented or stepped cable-managing arrangement 12 also includes a plurality of cable retaining structures 22 that retain cable on the radius limiting surfaces 20. In the illustrated embodiment, the cable retaining structures 22 include tabs 24 that extend upward from the radius limiting surfaces 20. In the embodiment of FIG. 3, the tabs 24 are located along an outer edge 26 of the radius limiting surfaces 20.

Figure 4:
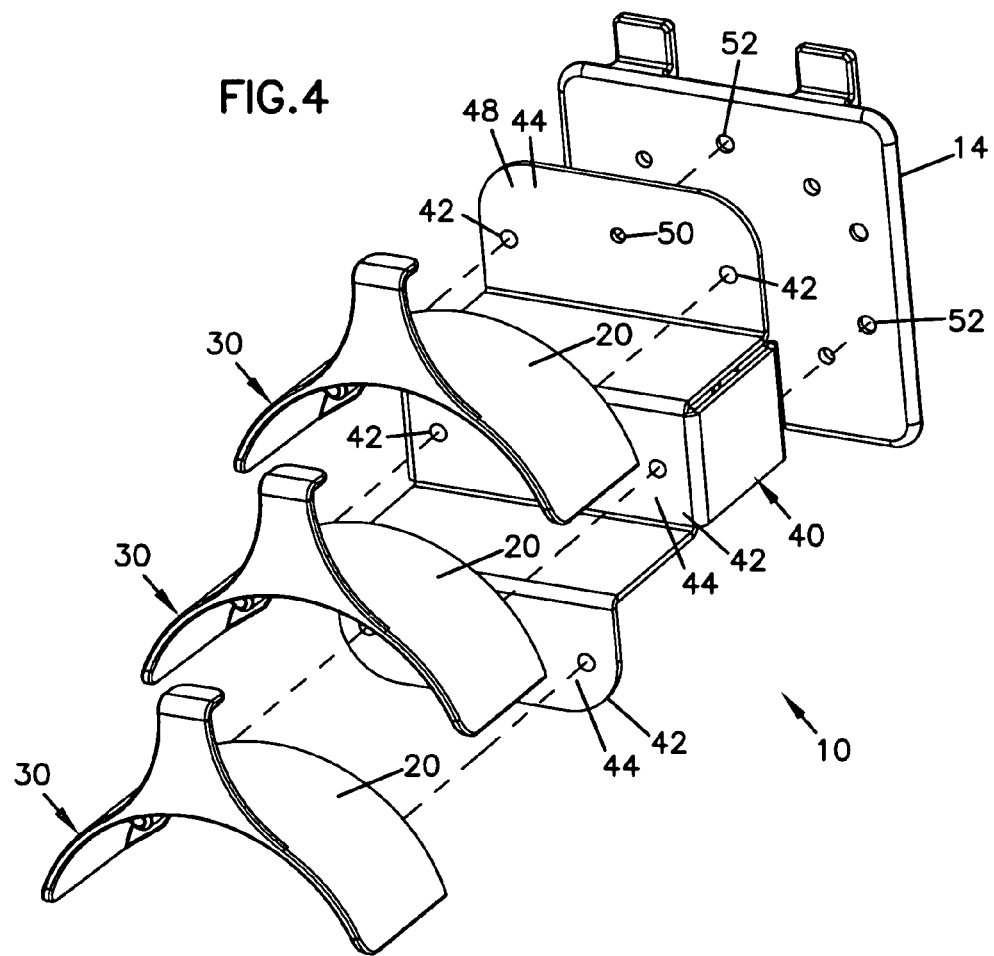
FIG. 4 is an exploded perspective view of the cable management device of FIG. 3.
Figure 5:
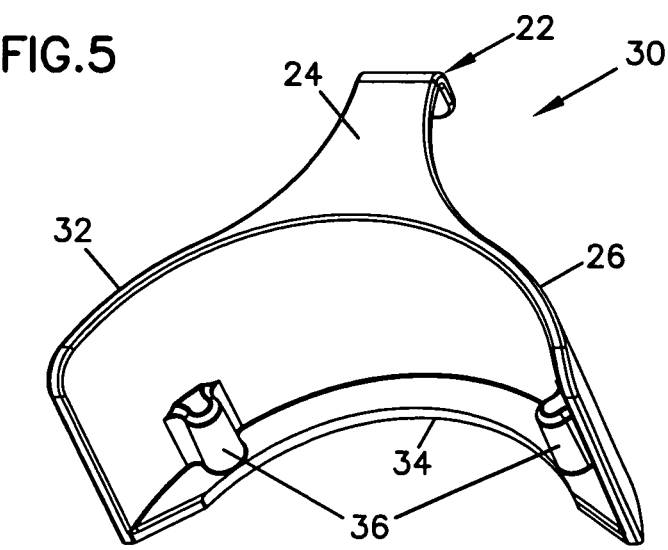
FIG. 5 is bottom perspective view of a radius limiting element of the cable management device of FIG. 4.

Referring now to FIGS. 3-5, the stepped radius limiting surfaces 20 are defined by radius limiting elements 30. The tabs 24 of the stepped cable-managing arrangement 12 are an integral construction of the radius limiting elements 30; although the tabs 24 or cable retaining structure 22 can be provided as a separate component. In the illustrated embodiment, the radius limiting surfaces 20 of each of the radius limiting elements 30 is discrete or separate from the other radius limiting surfaces. The discrete radius limiting surfaces 20 are oriented such that the surfaces extend outward or in a generally perpendicular direction relative to the back plate 14 (FIG. 3) of the device 10.

Still referring to FIGS. 3-5, the radius limiting elements 30 are configured as half-spools, each having an arcuate structure 32 (FIGS. 3 and 5) extending approximately 180 degrees. It is contemplated that the arcuate structure 32 can extend more or less than 180 degrees depending upon the telecommunications application in which the element will be used. As shown in FIG. 5, the arcuate structure 32 includes a flange 34 located at an end opposite the cable retaining structure 22. The flange 34 includes mounting structure 36, such as molded fastener structure, for securing the radius limiting element 30 to a stepped mounting bracket 40 (FIG. 4).

Figure 6:
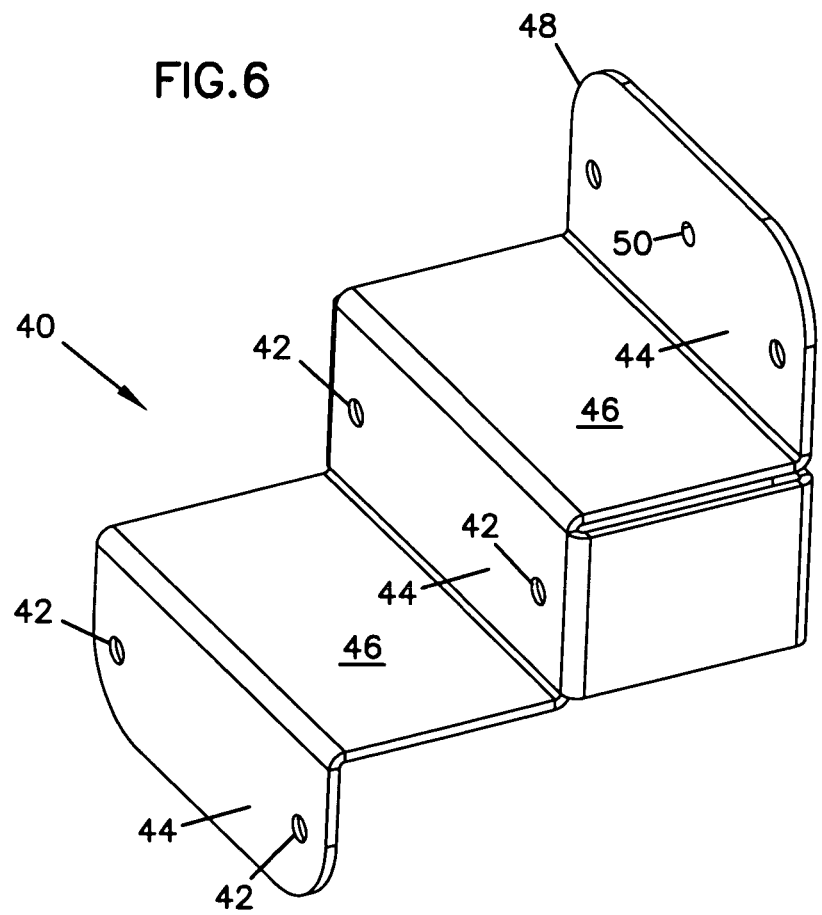
FIG. 6 is a side perspective view of a mounting bracket of the cable management device of FIG. 4.

Referring to FIGS. 4 and 6, the stepped mounting bracket 40 of the cable management device 10 includes corresponding mounting structure 42 (e.g. holes) at which the radius limiting elements 30 are mounted. In the illustrated embodiment, the stepped mounting bracket 40 includes rise portions 44 and run portions 46 (FIG. 6). The mounting structure 42 is located on the rise portions 44 of the stepped mounting bracket 40. An upper rise portion 48 of the bracket 40 includes additional mounting structure 50 for securing the mounting bracket 40 to mounting holes 52 (FIG. 4) formed in the back plate 14. The mounting bracket 40 can be secured to the back plate 14 by fasteners, rivets, or other securing elements. Further mounting structure (not shown) can be provided on the mounting bracket 40 for securing the bracket 40 to the back plate 14. In one embodiment, the stepped mounting bracket 40 is made of bent sheet metal, although other construction methods and materials can be used.

Figure 7:
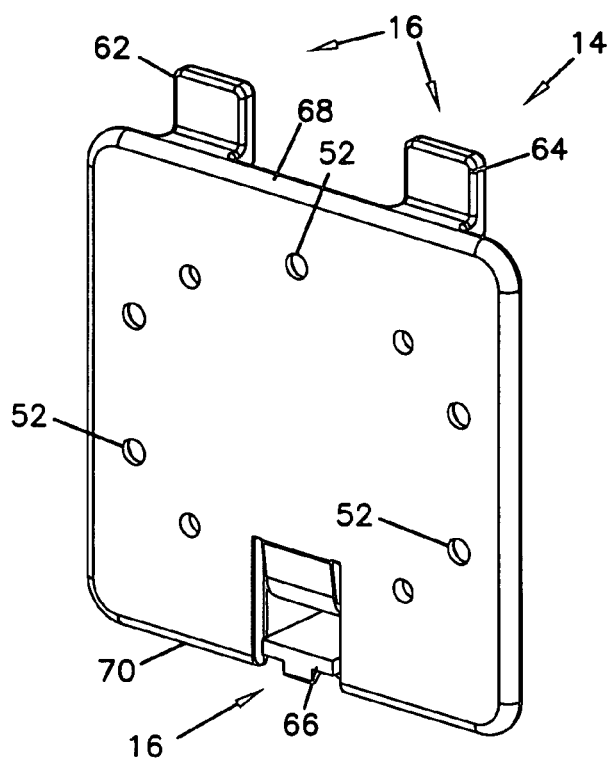
FIG. 7 is a front perspective view of a back plate of the cable management device of FIG. 4.
Figure 8:
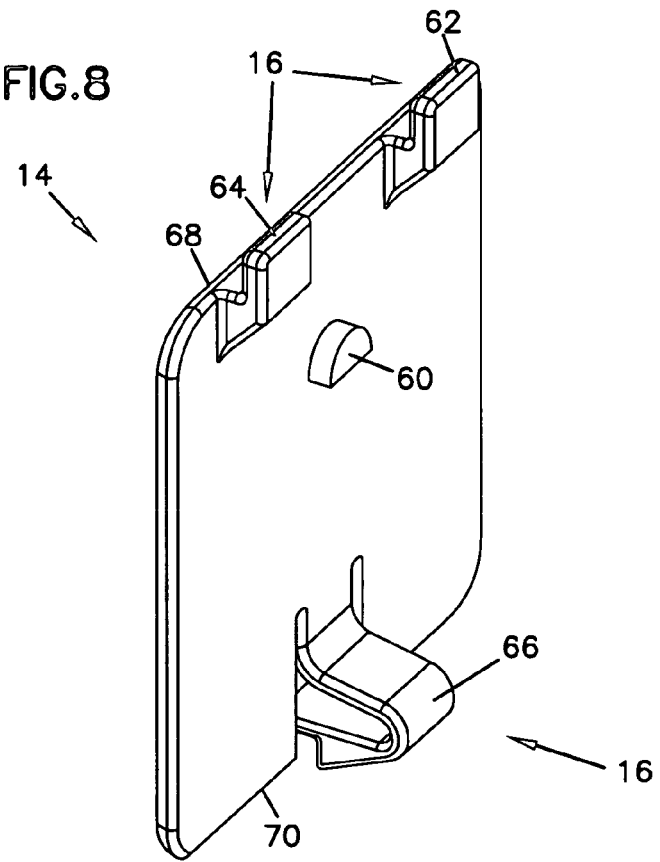
FIG. 8 is a rear perspective view of the back plate of the cable management device of FIG. 7, shown without mounting holes.

Referring now to FIGS. 7 and 8, in use, the securing structure 16 of the back plate 14 of the cable management device 10 is preferably configured to permit easy attachment and detachment of the device from the panel 90. In the illustrated embodiment, the securing structure 16 includes first and second attaching elements 62, 64, a flexible tab 66, and a locating element 60 (FIG. 8).

The first and second attaching elements 62, 64 of the securing structure 16 correspond to the attaching apertures 102 (FIG. 1) of the plurality of discrete openings 96 of the panel 90. Each of the first and second attaching elements 62, 64 are located adjacent to a top edge 68 of the back plate 14. As shown, the first and second attaching elements 62, 64 are hook-like attachments having a generally squared configuration that insert and hook into the square attaching apertures 102 of the panel 90. The flexible tab 66 also corresponds to the square attaching apertures 102 of the panel 90. The flexible tab 66 is centrally positioned adjacent to a bottom edge 70 of the back plate 14. The flexible tab 66 is constructed to provide an easy-to-use, snap-fit connection for detachably securing the device 10 to a selected attaching aperture 102 of the panel.

Referring back to FIG. 1, the locating apertures 104 of the plurality of discrete openings 96 of the panel 90 correspond to the locating element 60 (FIG. 8) formed on the backside of the back plate 14 of the cable management device 10. Further details of an example back plate that can be used in accordance with the principles disclosed is described in U.S. patent application Ser. No. 11/101,143, previously incorporated herein by reference. The present locating element 60 corresponds to the half-moon or half-circle configuration of the locating apertures 104. The locating element 60 in combination with the locating aperture 104 ensures that the cable management device 10 is properly oriented when mounted to the panel 90.

Referring still to FIG. 1, in the telecommunications industry, fiber optic cable 106 is typically provided in a particular standard length; yet, in each telecommunications application, the distance between the interconnected equipment varies, and most often does not correspond to the particular standard cable length. Accordingly, technicians are left with cable slack that requires careful storage to prevent attenuation or damage of the cables through which signals are transmitted. Further, storage of cable slack interconnected between two pieces of equipment is not easily collected, as each of the ends of the cable is typically terminated prior to collection of the cable slack. That is, the technician is often required to gather and store the center slack portion 108 of a terminated cable 106, as opposed to simply collecting slack at a free end of a cable.

Depending upon the particular length of the cable, and the distance between the two pieces of equipment, the length of the slack center portion 108 of a cable 106 can greatly vary. The present cable management devices are designed to reduce the occasion of having loose or hanging cable slack due to the varying length of the slack center portion 108. Loose or hanging cable slack can be accidentally pulled or tugged, which may cause the cable to exceed a minimum bend radius and further result in subsequent loss of signal transmission through the cable. The present cable management devices reduce the occasion of loose cable slack by accommodating the storage of many different cable lengths. In the alternative, the present cable management devices reduce overall installation costs by eliminating the need to provide specific, different cable lengths in an attempt to match the distance between two pieces of equipment and avoid the occasion of loose cable slack.

In particular, the present cable management devices incrementally take up or accommodate the center slack portions of cables. In conventional arrangements, upper and lower spools are provided a set distance apart from one another. The center slack portion is wound about the upper and lower spools; however, in most cases, the distance between the spools does not correspond to the overall length of the center slack portion. The excess center slack portion is then often left to drape or hang from the spool in an un-stored or un-taut manner. As previously described, such loose slack can become damaged. In contrast to conventional arrangements having only a single storage length defined between upper and lower spools, the present cable management devices provide multiple storage lengths.

Figure 9:
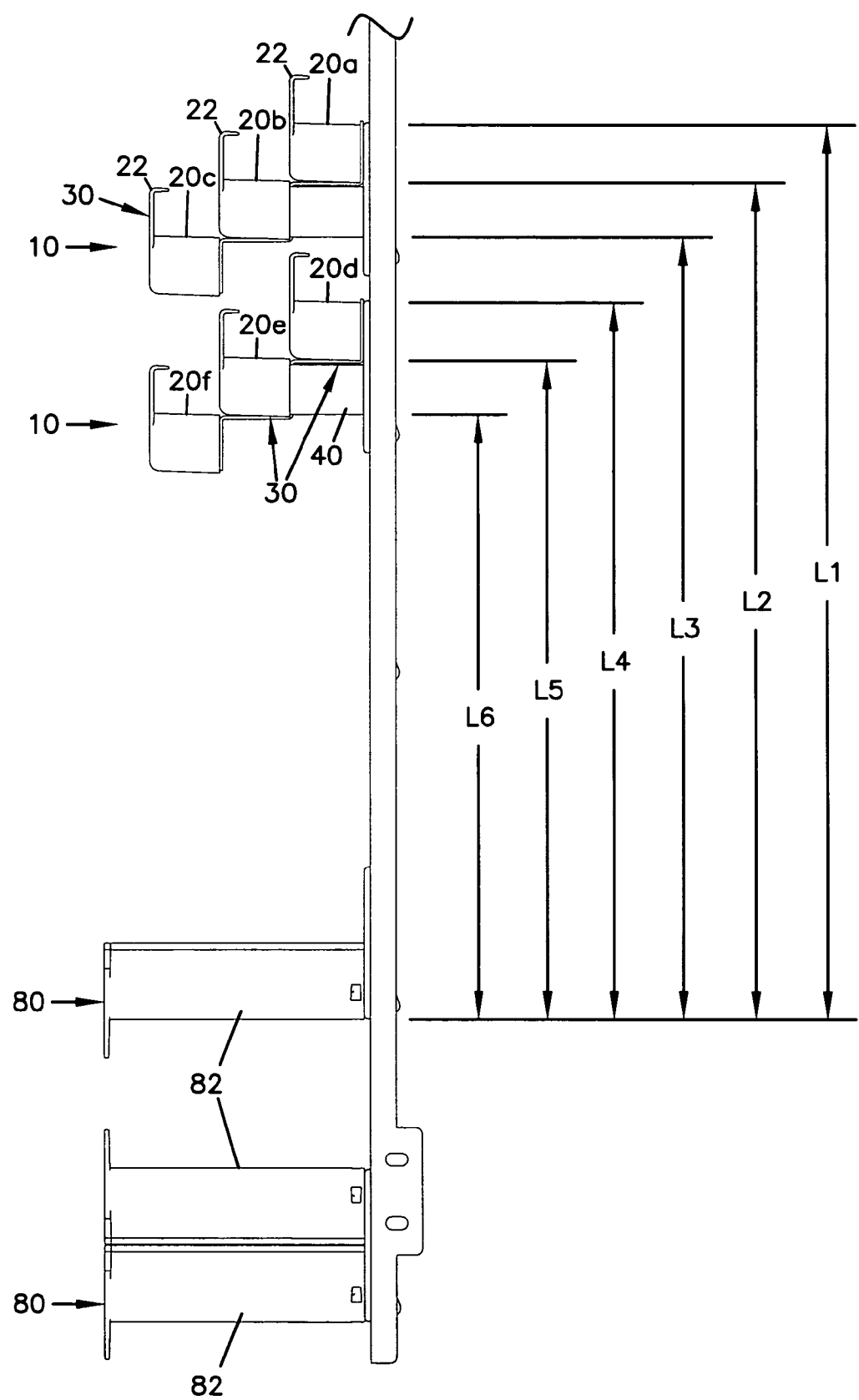
FIG. 9 is a partial, side elevation view of the cable management assembly of FIG. 2.

More specifically, referring to FIGS. 1 and 9, the cable management assembly 100 of the present disclosure typically includes the cable management device 10 used in combination with another component or device, such as a spool 80. The spool 80 can be a half-spool or a full-spool having a radius limiting structure 82. In use, the technician selectively routes the center cable slack portion 108 of a cable about the spool 80 and one or more of the three radius limiting surfaces 20 of the cable-managing arrangement 12 to accommodate an entire length of the center slack portion 108 without the occasion of loose cable slack.

For example, wrapping a first slack cable length of the center slack portion 108 completely around the spool 80 and an uppermost radius limiting surface 20a (FIG. 9) defines a first storage length L1. Wrapping a second slack cable length of the center slack portion 108 completely around the spool 80 and a middle radius limiting surface 20b defines a second storage length L2. A third storage length L3 corresponding to a lowermost radius limiting surface 20c is similarly defined. Because of the descending segmented arrangement of each of the radius limiting surfaces, the first, second and third storage lengths L1, L2, and L3 are different from one another. When storing the center slack portion 108 of the cable 106, a majority of the length of the center slack portion 108 can be wound or wrapped about the spool 80 and the uppermost radius limiting surface 20a, for example. Any excess of slack portion 108 not having a remaining length equivalent to the first storage length can be wrapped around one of the middle or lowermost radius limiting surfaces 20a, 20b having a shorter storage length. That is, as the slack cable length shortens, the technician can selectively wrap the cable around the middle or lowermost radius limiting surfaces 20b, 20c to incrementally take up the entire length of cable slack.

In the illustrated embodiment of FIG. 9, two nested cable management devices 10 are provided. The nested devices 10 are stacked or positioned in close proximity to one another to provide a denser and more incremental cable management solution. That is, because of the descending segmented design of the devices, a lower second device 10 can be tucked under an upper first device in a space provided in the footprint of the upper device 10. The space, similar to a stairwell space, accommodates the nesting of the devices to provide a denser cable management solution than provided by conventional arrangement having spools simply vertically aligned along a plane.

As shown in FIG. 9, the nested cable management devices 10 offer six radius limiting surfaces 20a-20f that provide six storage lengths L1-L6. Because of the stepped cable-managing arrangement of the devices 10, each of the six storage lengths L1-L6 is different from each of the other storage lengths providing even greater versatility in accommodating varying cable slack lengths.

In addition, the plurality of radius limiting surfaces of the present cable-managing device 10 are provided in a footprint that is smaller than conventional arrangements utilizing instead a number of separate spools. In such conventional arrangements, the spools are vertically aligned along a plane. As can be understood, the spools must be sufficiently spaced apart from one another to provide a clearance space between spools so that the tabs, for example, do not interfere with the other spools. The disclosed cable management device has multiple radius limiting surfaces that project forwardly from one another so that clearance for the cable retaining structure 22, for example, is provide forward of the preceding radius limiting surface; similarly, in the case of nesting devices, clearance for the cable retaining structure is provide under the "stairwell" space of the descending arrangement of surfaces. Accordingly, the footprint in which multiple radius limiting surfaces are provided is smaller in the present device 10 as compared to conventional arrangements.

In another method of use, the segmented cable-managing arrangement of the device(s) 10 offer the technician an opportunity to separate slack cable from other slack cable in a neat and organized manner. That is, another method of using the disclosed cable management device 10 includes separating and storing cable slack about designated radius limiting surfaces or elements and the spool 80, for example. Although in each of the previous methods of use, the devices are described in combination with the use of spools 80, other types of cable management components, such as finger devices, constructions having edge protections, and channel guides that contain cabling, for example, can also be used in accordance with the principles disclosed.

Figure 10:
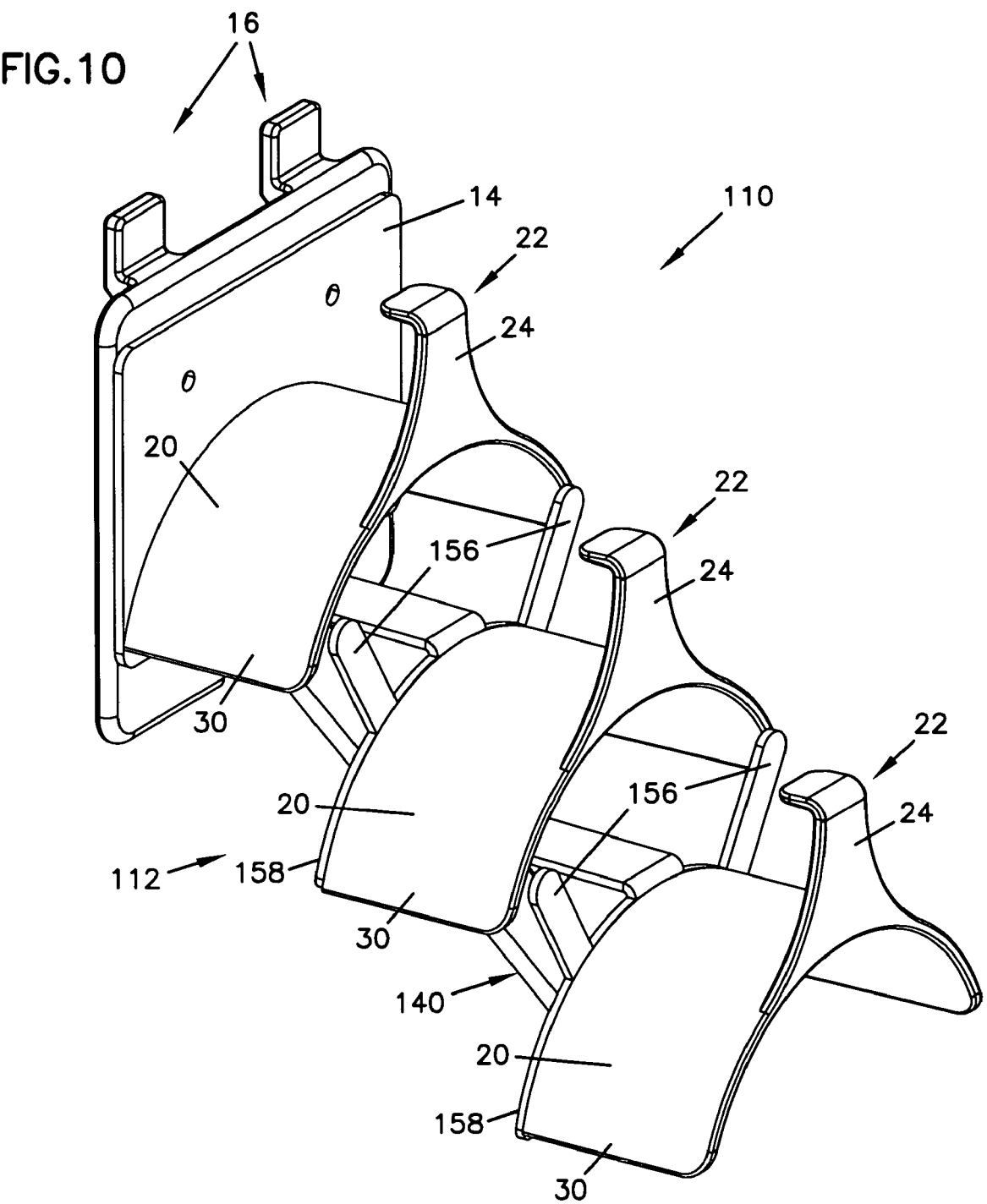
FIG. 10 is a perspective view of another embodiment of a cable management device shown mounted to the panel of the cable management assembly of FIG. 1.

Referring now to FIGS. 10-12, alternative embodiments of a cable management device, in accordance with the principles discloses, are illustrated. Each of the alternative cable management devices is similarly configured as that of the first embodiment to manage the center slack portion 108 of cable 106. In particular, each device includes a segmented cable-managing arrangement designed to incrementally take up the entire length of a cable slack portion 108 of a cable.

Referring to FIG. 10, the second embodiment of the cable management device 110, includes a segmented cable-managing arrangement 112 interconnected to a back plate 14 having securing structure 16 that detachably secures the device 110 to the panel 90. Similar to the previous embodiment, the segmented cable-managing arrangement 112 includes a plurality of radius limiting surfaces 20 vertically and forwardly offset from one another in a descending stepped relationship. The radius limiting surfaces 20 are defined by radius limiting elements 30. The radius limiting surfaces 20 of each of the radius limiting elements 30 is discrete or separate from the other radius limiting surface, and is oriented such that the radius limiting surface 20 extends outward or in a generally perpendicular direction relative to the back plate 14.

The radius limiting elements 30 and the back plate 14 of the cable management device 110 are the same as described with respect to the first embodiment. For example, the radius limiting elements 30 include cable retaining structures 22, such as tabs 24, that extend upward from the radius limiting surfaces 20. The device 110 of FIG. 10, however, illustrates a different mounting bracket embodiment 140 that can be used to mount the radius limiting elements 30 in a stepped or descending, segmented relationship. The alternative mounting bracket 140 includes mounting plates 158 to which the flanges (34 shown in FIG. 5) of the radius limiting elements 30 mount. Ears 156 extend upwardly from the mounting plates 158 to contain slack cable on the radius limiting surfaces 20 (i.e., between the ears 156 and the tabs 24).

Referring now to FIG. 11, yet another embodiment of a cable management device 210 having features in accordance with the principles of the present disclosure is illustrated. The illustrated cable management device 210 includes a segmented cable-managing arrangement 212. The segmented cable-managing arrangement 212 is interconnected to a back plate 14 having securing structure 16 that detachably secures the device 210 to the panel 90 (FIG. 1). Similar to the previous embodiments of FIGS. 3 and 10, the securing structure 16 of the back plate 14 of the cable management device 210 includes first and second securing elements 62, 64, a flexible tab 66 (shown in FIGS. 7 and 8), and a locating element 60 (shown in FIG. 8) to permit easy attachment and detachment of the device from the panel 90.

The segmented cable-managing arrangement 212 includes a plurality of radius limiting surfaces 220, and a plurality of cable retaining structures 222 that retain cable on the radius limiting surfaces 220. The cable retaining structures 222 include tabs 224 that extend upward from the radius limiting surfaces 220. The tabs 224 are located along an outer edge 226 of the radius limiting surfaces 220.

In the embodiment shown in FIG. 11, the segmented radius limiting surfaces 220 are defined by radius limiting elements 230 that are vertically and forwardly offset from one another in a descending stepped relationship. The radius limiting surfaces 220 of each of the radius limiting elements 230 is discrete or separate from the other radius limiting surface, and is oriented such that the radius limiting surface 220 extends outward or in a generally perpendicular direction relative to the back plate 14.

In contrast to the devices of FIGS. 3 and 10, the radius limiting elements 230 of FIG. 11 are configured as full-spools having an arcuate structure 232 extending 360 degrees. In the illustrated embodiment, there are three radius limiting elements 230 that define three radius limiting surfaces 220. In use, the three elements 230 provide three cable storage lengths, as previously described. In addition, the center slack portion 108 of a cable 106 can be wrapped about only one of the full-spool elements if needed to take up a small remaining length of cable slack.

Each of the radius limiting elements 230 includes a back wall 238 having mounting structure 236. The uppermost radius limiting element 230 is mounted directly to the back plate 14 via the mounting structure 236 of the back wall 238. To add additional stepped radius limiting elements 230, a front mounting plate 274 is mounted at the outer edge 226 of the uppermost radius limiting element. That is, the front mounting plate 274 is secured to front mounting structure 276 formed on the inside of the arcuate structure 232. The middle radius limiting element 230 can then be mounted and secured to the front mounting plate 274 of the preceding (uppermost) radius limiting element 230. As can be understood, this assembly method can continue to provide any number of stepped radius limiting surfaces 220.

Referring now to FIG. 12, still another embodiment of a cable management device 310 having features in accordance with the principles of the present disclosure is illustrated. The illustrated cable management device 310 includes a segmented cable-managing arrangement 312 interconnected to a back plate 14 having securing structure 16 that detachably secures the device 310 to the panel 90. Similar to the previous embodiments of FIGS. 3, 10, and 11, the securing structure 16 of the back plate 14 of the cable management device 310 includes first and second securing elements 62, 64, a flexible tab 66 (shown in FIGS. 7 and 8), and a locating element 60 (shown in FIG. 8) to permit easy attachment and detachment of the device from the panel 90.

The segmented cable-managing arrangement 312 includes a plurality of radius limiting surfaces 320, and a plurality of cable retaining structures 322, such as tabs 324, to retain cable on the radius limiting surfaces 320. In the embodiment shown in FIG. 12, the segmented radius limiting surfaces 20 are defined as sections of a continuous surface 354. The continuous surface 354 is defined by a single arcuate structure 332. The tabs 324 extend upward from the continuous surface 354 and define the segmented or sectioned radius limiting surfaces 320. In the illustrated embodiment, the tabs 324 define four segmented radius limiting surfaces 320 of the continuous surface 354.

The arcuate structure 332 of the cable management device 310 is configured as half-spool extending approximately 180 degrees. It is contemplated that the arcuate structure 332 can extend more or less than 180 degrees depending upon the telecommunication application in which the element will be used. The arcuate structure 332 includes a flange or back wall (not shown) having mounting structure for securing the radius limiting element arcuate structure 332 directly to the back plate 16.

As shown in FIG. 12, the continuous surface 354 of the arcuate structure 332 is oriented such that the radius limiting surfaces 320 angle downward in a non-perpendicular direction relative to the back plate 14. The angled orientation of the continuous surface 354 vertically and forwardly offsets the segmented radius limiting surfaces 320 from one another in a descending relationship; which provides the incremental cable slack storage previously described.

The present cable management devices (e.g., 10, 110, 210, 310) provide flexibility in permitting a technician to manage and store cables of different lengths without the occasion of loose cable slack. The above specification provides a complete description of the cable management assembly, system, and method. Since many embodiments of the invention can be made without departing from the spirit and scope of the invention, the invention resides in the claims hereinafter appended.

What is claimed is:

1. A cable management device, comprising:
   a) a cable-managing arrangement including a plurality of descending, segmented radius limiting surfaces, and a plurality of cable retaining structures, each of the descending, segmented radius limiting surfaces being vertically and forwardly offset from one another; and
   b) a back plate including securing structure for securing the device to a panel;
   c) wherein a clearance space is defined under upper radius limiting surfaces of the plurality of surfaces, the clearance spaces being vertically offset in correspondence to the vertically offset radius limiting surfaces, the clearance spaces being located within the footprint of the cable management device.

2. The device of claim 1, wherein the radius limiting surfaces are defined by radius limiting elements.

3. The device of claim 2, wherein the radius limiting elements are half-spools having an arcuate structure extending approximately 180 degrees.

4. The device of claim 2, wherein the radius limiting elements are full-spools having an arcuate structure extending 360 degrees.

5. The device of claim 2, wherein the cable retaining structures are located at an outer edge of the radius limiting surfaces of the radius limiting elements.

6. The device of claim 5, wherein the cable retaining structures include tabs extending upward from the radius limiting surfaces.

7. The device of claim 2, further including a stepped mounting bracket, the stepped mounting bracket being configured to vertically and forwardly offset the radius limiting elements from one another.

8. The device of claim 1, wherein the plurality of radius limiting surfaces of the cable-managing arrangement includes three radius limiting surfaces.

9. The device of claim 1, wherein the radius limiting surfaces are discrete surfaces.

10. The device of claim 9, wherein the discrete surfaces extend outward from the back plate in generally perpendicular direction.

11. he device of claim 9, wherein the cable-managing arrangement is a stepped cable-managing arrangement.

12. The device of claim 1, wherein the descending, segmented radius limiting surfaces are defined by a continuous surface that is sectioned by the cable retaining structures.

13. The device of claim 12, wherein the continuous surface extends outward from the back plate in a non-perpendicular direction.

14. The device of claim 1, wherein the securing structure includes a hook attachment located adjacent to a first edge of the back plate, and a flexible tab located adjacent to a second edge opposite the first edge, the flexible tab providing a snap-fit connection.

15. A cable management assembly, comprising:
   a) a panel defining a number of mounting locations;
   b) a first cable management device detachably secured to the panel at a selected mounting location, the first device including a first cable-managing arrangement having a first plurality of radius limiting surfaces;
   c) a second cable management device secured to the panel, the second cable management device including a radius limiting structure; and
   d) a third cable management device detachably secured to the panel, the third device including a third cable-managing arrangement having a third plurality of radius limiting surfaces;
   e) wherein each of the first and third radius limiting surfaces of the first cable management device and the third cable management device, in cooperation with the radius limiting structure of the second cable management device, defines a slack cable storage length, the length corresponding to each radius limiting surface of the first and third devices being different from one another.

16. The assembly of claim 15, wherein the mounting locations of the panel are defined by a plurality of discrete openings, the plurality of discrete openings including first shaped apertures and second shaped apertures, each of the first and second cable management devices including mounting structure corresponding to the first and second shaped apertures of the panel.

17. The assembly of claim 15, wherein the first cable management device includes a stepped cable-managing arrangement having a plurality of cable limiting elements that define the radius limiting surfaces, the cable limiting elements being vertically and forwardly offset from one another.

18. The assembly of claim 17, wherein the radius limiting elements are half-spools having an arcuate structure extending approximately 180 degrees.

19. The assembly of claim 17, wherein the radius limiting elements are full-spools having an arcuate structure extending 360 degrees.

20. The assembly of claim 15, wherein the first plurality of radius limiting surfaces include three radius limiting surfaces defining three different slack cable storage lengths.

21. The assembly of claim 15, wherein the radius limiting surfaces are discrete surfaces.

22. The assembly of claim 15, wherein the radius limiting surfaces are defined by a continuous surface segmented by cable retaining structures.

23. The assembly of claim 15, wherein at least the first cable management device includes a flexible tab to detachably secure the device to the panel at the selected mounting location.

24. The assembly of claim 15, wherein the cable-managing arrangement of each of the first and third cable management devices is a descending, segmented cable-managing arrangement, each of the radius limiting surfaces of the descending, segmented cable-managing arrangement being vertically and forwardly offset from one another.

25. The assembly of claim 24, wherein the descending, segmented cable-managing arrangements of each of the first and third cable management devices is a stepped cable-managing arrangement having a plurality of cable limiting elements that define discrete radius limiting surfaces.

26. The assembly of claim 15, wherein the first and third cable management devices define six different slack cable storage lengths.

27. The assembly of claim 15, wherein the second cable management device secured to the panel is a spool having a curved radius limiting surface.

28. The assembly of claim 27, wherein the spool having the curved radius limiting surface is a half-spool.

29. A method of managing a fiber optic cable, the method comprising the steps of:
   a) securing first and second cable management devices to a panel, the first cable management device including a first plurality of radius limiting surfaces, each of the first plurality of radius limiting surfaces being vertically and forwardly offset from one another;
   b) securing a third cable management device to the panel, the third cable management including a third plurality of radius limiting surfaces, each of the third plurality of radius limiting surfaces being vertically and forwardly offset from one another;
   c) wrapping a first slack cable length of a fiber optic cable completely around one of the radius limiting surfaces of one of the first and third cable management devices and the second cable management device; and
   d) wrapping a second slack cable length of the fiber optic cable completely around another of the radius limiting surfaces of one of the first and third cable management devices, and the second cable management device, the second slack cable length being shorter than the first slack cable length.

30. The method of claim 29, wherein the step of securing the third cable management device to the panel includes nesting the third cable management device beneath the first cable management device.

31. A cable management assembly, comprising:
   a) a panel defining a number of mounting locations;
   b) a first cable management device detachably secured to the panel at a selected mounting location, the first device including a first cable-managing arrangement having a first plurality of descending, segmented radius limiting surfaces, the segmented radius limiting surfaces being vertically and forwardly offset from one another, the vertically and forwardly offset surfaces defining a stairwell space there under; and
   c) a second nested cable management device detachably secured to the panel, the second nested cable management device being located adjacent to the stairwell space defined by the first cable management device, the second nested device including a second cable-managing arrangement having a second plurality of descending, segmented radius limiting surfaces;
   d) wherein the stairwell space of the first cable management device provides clearance to access cabling stored on the radius limiting surfaces of the second nested cable management device.

32. The assembly of claim 31, wherein each of the radius limiting surfaces of the first cable management device and the second cable management device, in cooperation with another radius limiting structure, defines a slack cable storage length, the length corresponding to each radius limiting surface of the first and second devices being different from one another.

33. The assembly of claim 31, wherein the radius limiting elements are half-spools having an arcuate structure extending approximately 180 degrees.

34. The assembly of claim 31, wherein the radius limiting elements are full-spools having an arcuate structure extending 360 degrees.

* * * * *